C. N. BROCK.
Treating Bone-Black.
No. 2,679.
Reissued July 16, 1867.
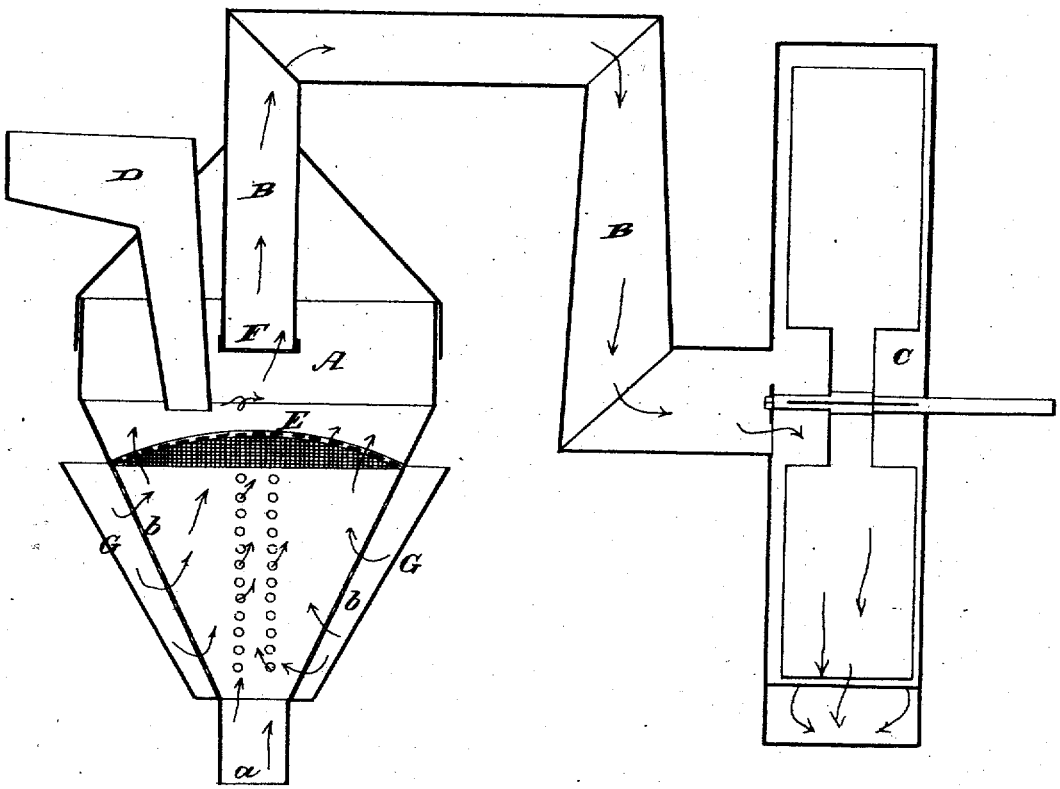
Witnesses:
J. H. Coombs,
R. S. Spencer.
Inventor:
C. N. Brock
per Munn & Co
attorneys

United States Patent Office.

CHARLES N. BROCK, OF PHILADELPHIA, PENNSYLVANIA.

*Letters Patent No.* 32,679, *dated July* 2, 1861; *reissue No.* 2,679, *dated July* 16, 1867.

IMPROVED MODE OF CLEANING AND PURIFYING BONE-BLACK.

The Schedule referred to in these Letters Patent and making part of the same.

TO ALL WHOM IT MAY CONCERN:

Be it known that I, CHARLES N. BROCK, of Philadelphia, in the county of Philadelphia, and State of Pennsylvania, have invented a new and improved Mode of Cleaning and Purifying Bone-Black; and I do hereby declare that the following is a full, clear, and exact description thereof, which will enable others skilled in the art to make and use the same, reference being had to the accompanying drawings, forming part of this specification.

My invention relates to a new and improved mode of cleaning and purifying bone-black after it has been reburned, to revive it for refining sugar, and it consists in subjecting the revived bone-black to a current or draught of air, which separates and removes the fine dust therefrom effectually.

By reburning bone-black after it has been used in refining sugar, it is revived to be employed for the same purpose again; but in the operation of reburning, a quantity of fine dust is formed, which clogs and obstructs the passage of the sirup if not removed, and renders it less valuable for filtering. The old method in use prior to my invention for cleaning and purifying the bone-black by removing the fine dust, is that of sifting and washing; but these operations accomplish the object very imperfectly, and the application of a current of air is the only effectual method of separating and removing the fine dust from bone-black. But a current of air may be applied in various ways, either by an exhaust or by blast. The apparatus which I employ for this purpose is represented in the accompanying drawing, in which—

A is an upright vessel or chamber, made of sheet iron or other material, with its lower portion of the form of an inverted frustum of a cone, with a central opening, *a*, at its bottom, for the entrance of an upward current of air, and for the outlet of the bone-black. B is a pipe connecting the upper part of the vessel A with a suitably-arranged exhausting blower, C, and extending some distance downward into the said vessel. D is a hopper, entering the upper part of the vessel for the delivery thereinto of the bone-black, which it receives from the kiln. E is a screen or perforated plate, fitted to the vessel A below the mouth of the pipe B, and having openings large enough for the grains of bone-black to pass through. F is a screen, fitted to the mouth of the pipe B, and having its openings too small for the passage of the grains of the bone-black. *b b* are openings in the lower inverted conical portion of the vessel A, within the curb or casing G, and below the screen, said openings being too small for the passage of the grains of bone-black. G G are shields to the said openings, closed at the bottom, but open at the top for the entrance of air.

The operation of the apparatus may be described as follows: The fan produces a strong upward current of air through the vessel A, the air entering by the opening *a*, while the dry burnt bone-black, delivered into the vessel by the hopper D, falls through the said current. The impurities, by reason of their light, dust-like character, are carried off through the blower, and the bone-black, in a pure state, falls through the opening *a* into a suitable receptacle placed below. The opening *a* may be furnished with a valve by which to close it while the vessel A is filling, the air in the mean time entering the chamber by the openings *b b*.

It will be seen that the current of air by which the fine dust is separated and removed from the bone-black in this apparatus is produced by the exhaust of a fan; but as obviously other mechanical means may be applied to produce the same effect, without deviating from the plan or method of operation of my invention hereinbefore described, I do not limit my invention to those particular mechanical devices and arrangements.

What I do claim as new, and desire to secure by Letters Patent, is—

1. Cleaning and purifying bone-black by the application of a current of air, substantially as herein described.

2. The combination of the perforated receiving-vessel A, and diaphragm or screen E, with the supply pipe or vessel D, the air pipe B, and fan C, substantially in the manner and for the purpose herein shown and described.

3. The screen F, in combination with the receiving-vessel A, for separating and removing the fine dust from bone-black by means of a current of air, substantially as herein described.

The above specification of my invention signed by me this 25th day of May, 1867.

CHARLES N. BROCK.

Witnesses:

WM. F. MCNAMARA,

ALEX. F. ROBERTS.